United States Patent [19]
Smidrkal et al.
[11] Patent Number: 4,637,894
[45] Date of Patent: Jan. 20, 1987

[54] ACTIVATOR OF PEROXO COMPOUNDS

[75] Inventors: Jan Smidrkal; Jaroslav Simunek, both of Rakovnik; Jiri Tolman, Krivoklat; Jiri Soucek, Prague; Alois Novacek, Usti; Jan Novak; Vaclav Krob, both of Racovnik; Pavel Kovar, Prague; Miroslav Klofec; Bohumir Vondracek, both of Usti, all of Czechoslovakia

[73] Assignee: Tukovy Prumysl, Koncern, Prague, Czechoslovakia

[21] Appl. No.: 706,511

[22] Filed: Feb. 28, 1985

[30] Foreign Application Priority Data

Feb. 29, 1984 [CS] Czechoslovakia .................... 1387-84

[51] Int. Cl.[4] .............................................. C01B 15/00

[52] U.S. Cl. ..................................... 252/186.4; 8/107; 252/95; 252/102; 252/186.39; 252/186.25

[58] Field of Search ....................... 252/186.38, 186.39, 252/186.4, 186.41, 186.43, 186.44, 186.27, 186.28, 186.29, 186.3, 186.31, 186.25, 97, 9 S, 99, 102; 8/111, 107

[56] References Cited

U.S. PATENT DOCUMENTS 3,532,634 10/1970 Woods ......................... 252/186.4 X
3,640,876 2/1972 Donaghu ................... 252/186.38 X
3,969,257 7/1976 Murray ...................... 252/186.38 X
4,016,090 4/1977 Nakagawa et al. ........ 252/186.38 X
4,374,747 2/1983 Tai ............................ 252/186.31 X

*Primary Examiner*—John F. Terapane
*Assistant Examiner*—Susan Wolffe

[57] ABSTRACT

The present invention relates to an activator of peroxo compounds, its method of manufacture, and its method of use. The activator is useful as an additive to textile cleansing and disinfecting agents that contain peroxo compounds. The invention permits the bleaching and disinfecting of textiles at temperatures between 25° C. and 60° C.

The activator comprises a combination of the following compounds, by weight: (a) phthalic anhydride (4–98%); (b) N-acetylphthalimide (2–96%); (c) phthalimide (0.1–28%); (d) stabilizer (0.2–25%) and/or (e) soluble polymer (0.2–12%); wherein the stabilizer is an aliphatic carboxylic acid having from 12–22 carbon atoms, the polymer is soluble in water or in organic solvents, and the particle size of the final activator composition is from 0.1 to 3.5 mm.

The activator component mixture is converted into particles spraying the molten liquid through a nozzle or atomizer in a cooling tower, or by solidification in a fluid bed, or by grinding of the melt after solidification on cooling rollers.

7 Claims, No Drawings

ACTIVATOR OF PEROXO COMPOUNDS

The present invention relates to an activator of peroxo compounds, its method of manufacture, and its method of use. The activator is useful as an additive to textile cleansing and disinfecting agents that contain peroxo compounds. Known peroxo compounds are able to oxidize, bleach, and disinfect textiles at the relatively high temperature of about 70° C. The additive of the invention permits the bleaching and disinfecting of textiles at temperatures from 25° C. to 60° C.

BACKGROUND OF THE INVENTION

A number of peroxo compound activators are known. The most common of these is tetracetylglycoluril, as disclosed in West German Pat. No. 1,770,854. Tetracetylglycoluril is an efficient and potent activator and has become a reference standard in the industry for the evaluation of other peroxo activators. Other known activators are tetracetylethylene diamene (West German Pat. No. 2,816,174); pentacetylglucose (Japanese Pat. No. 8,021,467); and N-acetylsuccinimide, N-benzoylsuccinimide, and N-acetylphthalimide (U.S. Pat. No. 3,969,257). These are all prepared by acetylation of corresponding precursors in an acetanhydride excess. Other known activators are produced on a large scale by oxidation of benzene or naphthalene in air or oxygen. These include anhydrides of organic acids such as maleinic anhydride and phthalic anhydride.

The known anhydrides suffer from a serious disadvantage when combined with a detergent or washing agent: they decompose very rapidly and loose much if not all of their activity during storage. A slower rate of decomposition has been achieved with the known acetyl compounds.

To counteract this disadvantage, researchers have sought to stabilize the activators, and a number of stabilization processes are now known. For example, the activators can be granulated and mixed with other additives, or they can be coated with a protective film. In practice, stabilization has become necessary in order to maintain the shelf-life of the known activators so that they remain effective for a reasonable period of time.

As shown in Table 1, tetracetylglycoluril is the most stable and effective of the known activators. It is also the most expensive, and is not often used for commercial applications. The table also shows that tetracetylglycoluril, tetracetylethylene diamene, and pentacetylglucose have a satisfactory shelf-life and an acceptable stability when stored with a detergent, but they are also expensive. Phthalic anhydride and N-acetylphthalimide do not have an acceptable shelf-life.

SUMMARY OF THE INVENTION

It is an object of the invention to provide a new and improved peroxo activator that overcomes the above-identified disadvantages. In particular, the new activator is potent, effective, long-lasting, and inexpensive relative to known activators.

A preferred embodiment of the new activator is a combination of the following compounds:

(a) phthalic anhydride (4–98 percent by weight)
(b) N-acetylphthalimide (2–96 percent by weight)
(c) phthalimide (0.1–28 percent by weight)
(d) stabilizer (0.2–25 percent by weight) and/or
(e) soluble polymer (0.2–12 percent by weight).

The stabilizer is an aliphatic carboxylic acid having from 12–22 carbon atoms. The polymer is soluble in water or in organic solvents. The particle size of the final activator composition is from 0.1 to 3.5 mm.

The activator is produced by spraying a dissolved or molten mixture of components into particle droplets having a size of 0.1 to 3.5 mm, followed by solidification.

In one embodiment, 2 moles of phthalic anhydride are reacted with 0.1 to 1.9 moles of formamide, and the resulting mixture is then reacted with 0.1 to 3.8 moles of acetanhydride. This mixture is then processed into particles of 0.1 to 3.5 mm.

In another embodiment, 0.1 to 1.9 moles of phthalic anhydride are combined with 0.1 to 1.9 moles of phthalimide and 0.1 to 3.8 moles of acetanhydride, followed by processing into particles of 0.1 to 3.5 mm.

An equimolar amount of ketene can be used as the acetylating agent in place of or in combination with acetanhydride.

The invention is useful as an activator of peroxo compounds in an amount of from 0.2 to 98 gm of activator per gm of active oxygen. For use in an oxidizing, bleaching, and disinfecting liquid, one liter corresponds to 2 to 500 mg of active oxygen.

The activator of the invention is advantageous because it is potent, efficient, inexpensive, and resistant to decomposition and loss of activity.

The combined activator of the invention exhibits a significantly higher activity than that of any of its individual components. As shown in Table 1, the combination of phthalic anhydride and N-acetylphthalimide provides a beneficial synergistic effect. A comparison of all five embodiments with the individual components and with other known activators (tetracetylglycoluril, tetracetylethylenediamine and pentacetylglucose) demonstrates that the activity, stability, and useful life of the invention is as good or better than the activity of the reference standard and most potent known activator: tetracetylglycoluril. In addition, the new composition is less expensive to produce.

The new activator is obtained by a process that results in minimal waste, and without the production of waste water. The reaction by-products are formic and acetic acid. The initial raw materials are abundant and inexpensive. The process does not require a complicated industrial plant. The molten activator component mixture is converted into particles of the desired size by spraying the molten liquid through a nozzle or atomizer in a cooling tower, or by solidification in a fluid bed, or by grinding of the melt after solidification on cooling rollers.

The invention permits the substitution of urea or acetamide for formamide; and/or the substitution of propionic or butyric anhydride for acetanhydride. These substitutions, however, do not provide any particular advantages. The activator can contain unreacted phthalimide, dyes, and other similar components.

The composition of the invention is useful an an activator for peroxo compounds, including sodium perborate, sodium percarbonate, peroxourea, and hydrogen peroxide.

When the activator is used in combination with a suitable peroxo compound, bleaching and disinfecting processes can be carried out at temperatures of 25° to 60° C. This makes it possible to treat delicate and synthetic fabrics that cannot withstand the heat needed to induce bleaching by unactivated peroxo compounds. In addition, there is a substantial reduction in energy consumption when washing occurs at lower temperatures. The fabrics themselves are subject to much less stress, and less damage occurs.

It is possible to use the activator in combination with peroxo compounds at temperatures between 80°–90° C. At these high temperatures, for example, a mixture containing 3% sodium perborate and 5% activator achieves the same bleaching effect as 20% unactivated (orthodox) sodium perborate.

TABLE I

A comparison of bleaching activity and stability of peroxo activators in luminance factor units. The initial luminance factor of untreated fabric is 15. The measurements below exhibit a deviation of +/− 1 unit.

| | CHANGE IN LUMINANCE FACTOR DURING STORAGE (in months) | | | | | |
|---|---|---|---|---|---|---|
| ACTIVATOR | 0 | 1 | 2 | 4 | 8 | 12 |
| none | 21 | 21 | 21 | 21 | 21 | 21 |
| tetracetylglycoluril | 39 | 37 | 36 | 35 | 33 | 32 |
| tetracetylethylene-diamine | 27 | 27 | 26 | 26 | 26 | 25 |
| pentacetylglucose | 36 | 35 | 35 | 34 | 33 | 32 |
| phthalic anhydride | 33 | 29 | 26 | 24 | 23 | 22 |
| N—acetylphthalimide | 35 | 32 | 30 | 29 | 28 | 27 |
| Example 1 | 38 | 36 | 35 | 35 | 34 | 34 |
| Example 2 | 38 | 37 | 36 | 36 | 35 | 35 |
| Example 3 | 34 | 32 | 31 | 30 | 30 | 29 |
| Example 4 | 37 | 36 | 35 | 35 | 34 | 34 |
| Example 5 | 37 | 35 | 34 | 34 | 33 | 33 |

The tests set forth in Table 1 were conducted on fabrics dyed a sulphur green, which is sensitive to oxidation bleaching. The size of the activator particles ranged between 0.6 and 1.0 mm. The tests occurred at 50° C. for 30 minutes, with a liquor ratio of 1:50 and a washing agent cocentration of 5 gm/l. The composition of the washing agent, by weight, was as follows:

activator: 10
sodium perborate: 5
sodium alkylarylsulfonate: 10
nonionogenic tenside: 4
soap: 5
sodium silicate ($SiO_2$:$Na_2O$=2:1): 6
sodium tripolyphosphate: 38
optical brightener: 0.3
carboxymethylcellulose: 1.5
residual water: 3.5
sodium sulfate: ad 100%

The washing agent, with activator, was stored in a paper box at 22° C. and with a relative humidity of 65%.

PREFERRED EMBODIMENTS

The invention is further described with respect to a number of preferred embodiments. It is understood that these examples are illustrative only, and do not serve to limit the scope of the invention or the appended claims.

Example 1

A mixture of 2 moles phthalic anhydride (296 g) and 1 mole formamide (45 g) was stirred and heated to 160° C. for two hours, and 36 g of formic acid were distilled off. Over the next half hour, 1.4 moles of acetanhydride (143 g) was added drop by drop, and the temperature was reduced to 140° C. The reaction mixture was then heated to a boil for two hours and 60 g of an acetic acid and acetanhydride mixture was distilled off. The mixture was then cooled from 165° C. to 145° C. and an additional 22 g of acetic acid and acetanhydride was removed by distillation under subatmospheric pressure. The reaction mixture, in a molten state, was sprayed through a 1 mm nozzle and onto a cooling tower at a speed of 10 mps. The air temperature of the tower was 20° C., and the air flow was maintained at 0.2 mps. The end-product activator was obtained in globular particles 0.6 to 1.2 mm in diameter. The final yield of activator contained the following components, according to elementary and $^1$H-NMR spectrum analysis: 62.3% phthalic anhydride, 29.9% N-acetylphthalimide, and 7.7% phthalimide.

Example 2

An activator was prepared according to the method of Example 1, with the following additional step: 8 g of stearic acid was added to the reaction mixture after removal of the acetic and acetanhydride mixture by distillation at 145° C.

Example 3

An activator was prepared according to the method of Example 1, with the following modifications: 0.3 moles of formamide (13.5 g) and 0.45 moles of acetanhydride (45.9 g) were used; the molten mixture was discharged at a temperature of 145° C. onto cooling rollers; and the solidified end-product was ground into particles 0.8 to 1.8 mm in diameter.

Example 4

An activator was prepared according to the method of Example 1, with the following modifications: 1.6 moles of formamide (72 g) and 2 moles of acetanhydride (204 g) were used; and the particles obtained were coated with 10 g of stearic acid in a granulating drum at 70° C.

Example 5

A mixture of 1 mole phthalic anhydride (148 g) and 1 mole phthalimide (147 g) was agitated and heated to 160° C. Then, 1.4 moles of acetanhydride (143 g) was added drop by drop, and the temperature was reduced to 140° C. The reaction mixture was then heated to a boil for two hours, and 92 g of an acetic acid and acetanhydride mixture was distilled off over the next two hours, during which the temperature was raised from 140° C. to 182° C. The mixture was then cooled to 145° C. and the reaction mixture, in a molten state, was sprayed upward at this temperature through a 1.2 mm nozzle and onto a cooling tower at a speed of 12 mps. The air temperature of the tower was 20° C., and the air flow was maintained at 0.1 mps. The end-product activator was obtained in globular particles 0.8 to 1.8 mm in diameter.

Example 6

A mixture of 2 moles phthalic anhydride (296 g) and 0.2 moles phthalimide (29.4 g) was stirred and heated to 160° C. Then, 0.25 moles of ketene was added drop by drop for two hours, after which the temperature was reduced to 140° C. The reaction mixture, in a molten state, was sprayed at this temperature through a 1.2 mm nozzle and onto a cooling tower at a speed of 11 mps. The air temperature of the tower was 20° C., and the air flow was maintained at 0.1 mps. The end-product activator was obtained in globular particles 0.8 to 1.9 mm in diameter. The final yield of activator particles (1500 g) was then sprayed with 30 g of polyvinyl alcohol (m.w.

14,000) in 150 ml of water at 20° C. The product was then dried on a fluid bed at 40° C.

Example 7

A solid mixture of 1 mole phthalic anhydride (148 g) and 0.35 moles N-acetylphthalimide (66.2 g) having particles ranging in diameter between 0.1 and 0.2 mm was granulated in a granulating drum with 12 ml of a 10% aqueous solution of caprolactam. The particles produced were 1.5 to 2.5 mm in diameter, and these were dried at 50° C. The properties of the end-product activator correspond to the activator of Example 1.

Example 8

A mixture of 0.1 moles phthalic anhydride (14.8 g), 1 mole N-acetylphthalimide (189 g), and 10 g stearin was melted and sprayed through a 0.6 mm nozzle and onto a cooling tower at a speed of 6 mps. The air temperature of the tower was 23° C., and the air flow was maintained at 0.2 mps. The final yield of activator particles (500 g) was then sprayed with 1 g of stearic acid in 20 ml of a 96% aqueous solution of ethanol at 25° C. The end-product activator was then dried on a fluid bed.

Example 9

A cleansing agent useful for washing at 60° C. is composed of (by weight):

activator of Example 2: 8
nonionogenic tenside (oxyethylated fatty alcohol): 6
sodium soap (higher fatty acids): 3
sodium dodecylbenzene sulphonate: 6
sodium tripolyphosphate: 39
sodium silicate ($SiO_2$: $Na_2O$=2:1): 4
optical brightener+carboxymethylcellulose+perfume: 2
residual water: 3
sodium perborate: 5
sodium sulfate: 24

Example 10

A cleansing agent useful for washing at 90° C. is composed of (by weight):

activator of Example 4: 4.5
sodium perborate: 5
tenside (oxyethylated monoethanolamines): 3
sodium soap (higher fatty acids): 3
sodium alkylbenzene sulphonate: 6
sodium tripolyphosphate: 30
sodium silicate ($SiO_2$: $Na_2O$=2:1): 10
optical brightener+carboxymethylcellulose+perfume: 2
residual water: 4
sodium percarbonate: 2
sodium sulfate: 31.5

Example 11

A cleansing agent useful for washing fabrics and synthetic blends at 60° C. is composed of (by weight):

activator of Example 5: 12
sodium perborate: 7
nonionogenic tenside: 9
sodium soap (higher fatty acids): 4
sodium tripolyphosphate: 36
sodium silicate ($SiO_2$: $Na_2O$=2:1): 5
optical brightener+carboxymethylcellulose+perfume: 1.5
residual water: 4.5
sodium sulfate: 21

Example 12

Objects with a solid surface can be disinfected according to the following method:

A 1.0 g/l solution of the activator of Example 3 was added to a solution of a conventional washing agent at 30° C. (The washing agent contains active oxygen in a concentration of 50 mg/l.) After 10 minutes, the activated washing agent was applied to the objects for disinfection.

We claim:

1. An activator of peroxo compounds comprising from 4 to 98 percent by weight of phthalic anhydride and from 2 to 96 percent by weight of N-acetylphthalimide.

2. An activator as in claim 1 further comprising from 0.1 to 28 percent by weight of phthalimide.

3. An activator as in claim 1 further comprising from 0.2 to 25 percent by weight of a stabilizer chosen from the group consisting of aliphatic carboxylic acids having 12 to 22 carbon atoms.

4. An activator as in claim 1 wherein the components are combined into particles having a diameter of from 0.1 to 3.5 millimeters.

5. An activator of peroxo compounds in particle form comprising, by weight, from 4–98 percent phthalic anhydride, from 2–96 percent N-acetylphthalimide, from 0.1 to 28 percent phthalimide, from 0.2 to 25 percent stabilizer selected from the group consisting of aliphatic carboxylic acids having 12 to 22 carbon atoms, and 0.2–12 percent soluble polymer; the activator particles having a diameter of 0.1 to 3.5 millimeters.

6. A method of activating peroxo compounds for use as a solid clensing agent comprising the step of combining an activator comprising, by weight, from 4–98 percent phthalic anhydride, from 2–96 percent N-acetylphthalimide, from 0.1 to 28 percent phthalimide, from 0.2 to 25 percent stabilizer selected from the group consisting of aliphatic carboxylic acids having 12 to 22 carbon atoms, and 0.2–12 percent soluble polymer; the activator particles having a diameter of 0.1 to 3.5 millimeters; with at least one peroxo compound selected from the group consisting of sodium perborate, sodium percarbonate, peroxourea, and hydrogen peroxide;

in an amount ranging from 0.2 to 98 grams of activator per gram of active oxygen.

7. A method of activating peroxo compounds for use as a liquid clensing agent comprising the step of combining an activator comprising, by weight, from 4–98 percent phthalic anhydride, from 2–96 percent N-acetylphthalimide, from 0.1 to 28 percent phthalimide, from 0.2 to 25 percent stabilizer selected from the group consisting of aliphatic carboxylic acids having 12 to 22 carbon atoms, and 0.2–12 percent soluble polymer; the activator particles having a diameter of 0.1 to 3.5 millimeters; with at least one peroxo compound selected from the group consisting of sodium perborate, sodium percarbonate, peroxourea, and hydrogen peroxide;

where the amount of active oxygen ranges from 2 to 500 mg per liter of clensing agent.

* * * * *